2 Sheets--Sheet 1.
E. P. WARNER & J. B. ODELL.
Improvement in Electric Railway-Signal Apparatus.
No. 130,776. Patented Aug. 20, 1872.
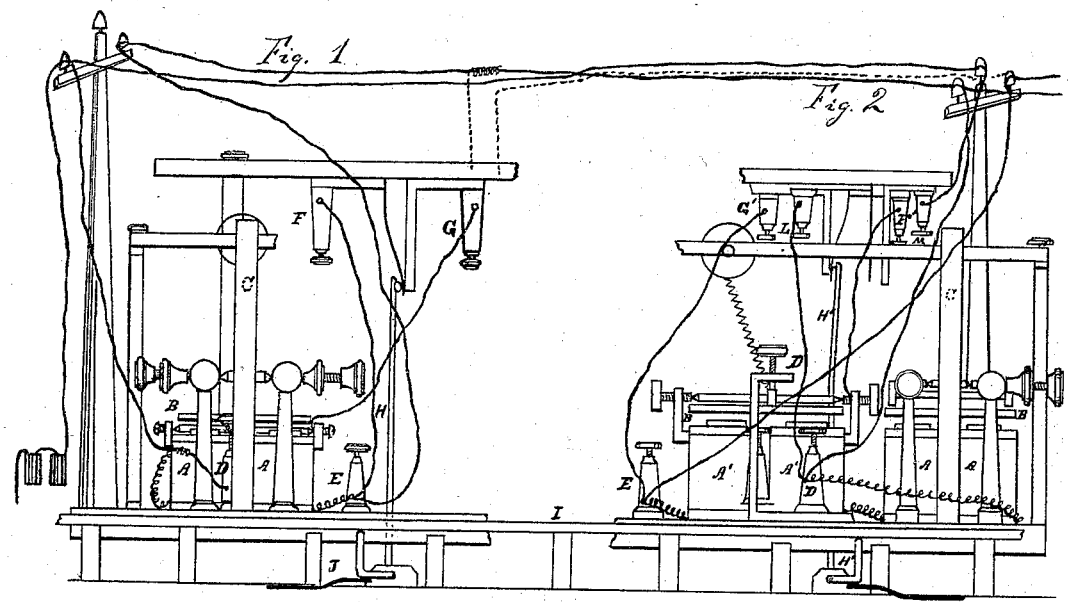
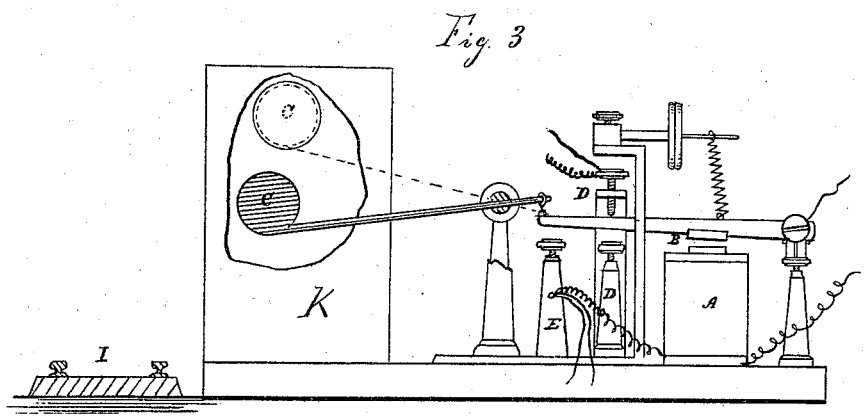

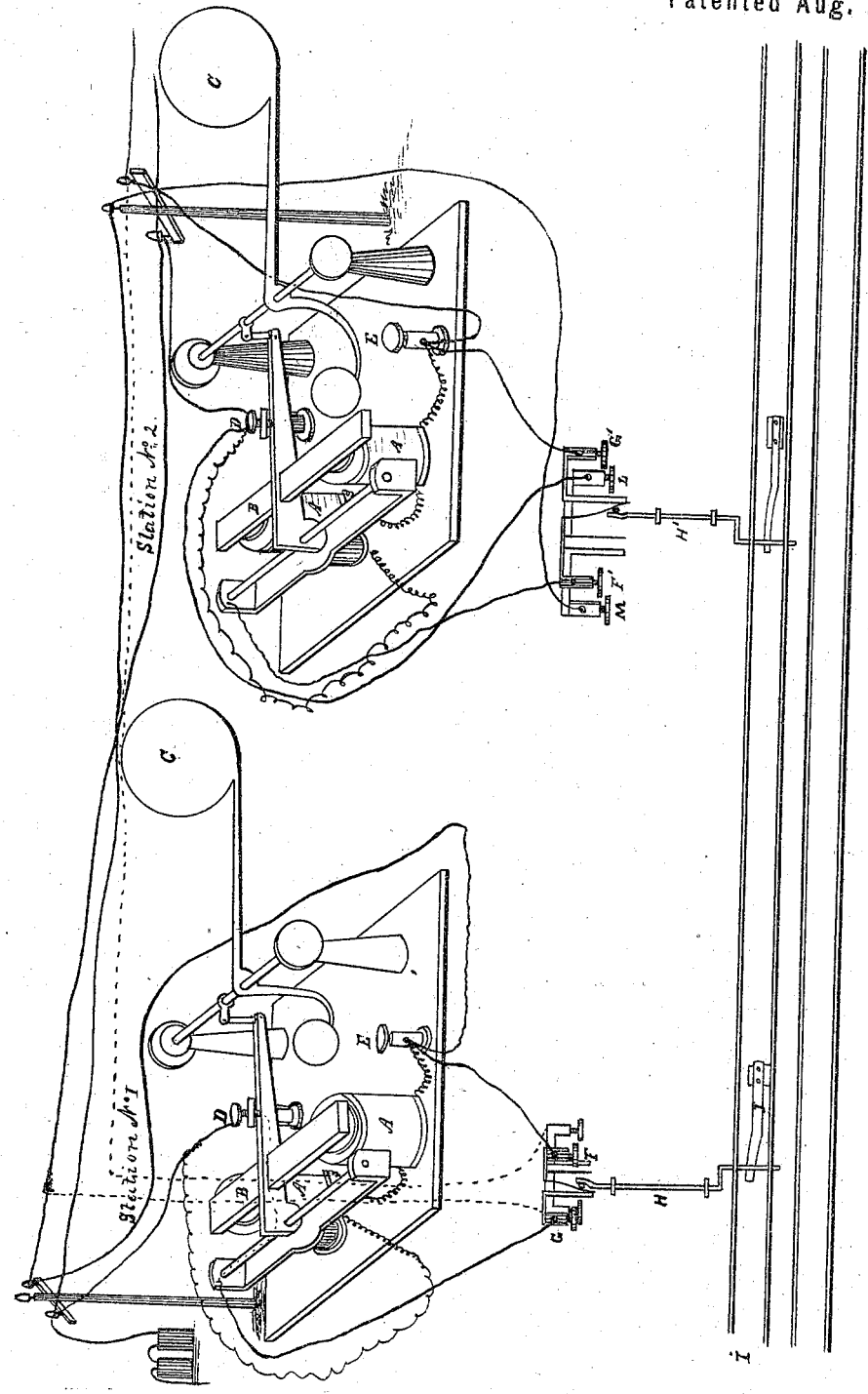

UNITED STATES PATENT OFFICE.

ELERY P. WARNER AND JOHN B. ODELL, OF GALESBURG, ILLINOIS, ASSIGNORS OF ONE-THIRD THEIR RIGHT TO F. H. TUBBS, OF SAME PLACE.

IMPROVEMENT IN ELECTRIC RAILWAY SIGNALS.

Specification forming part of Letters Patent No. 130,776, dated August 20, 1872.

SPECIFICATION.

*To whom it may concern:*

Be it known that we, ELERY P. WARNER and JOHN B. ODELL, of Galesburg, in the county of Knox and State of Illinois, have invented certain new and useful Improvements in Electric Railway Signals, of which the following is a full, clear, and exact description, which will enable others skilled in the art to which our invention appertains to make and use the same, reference being had to the accompanying drawing and chart forming a part of this specification, and in which—

Figure 1, Plate 1, represents a front elevation of the apparatus employed at the terminal stations, and Fig. 2 a like view of the apparatus employed at intermediate stations. Fig. 3 represents a side elevation of the apparatus, shown in Fig. 1. Plate 2 represents a plan or chart of a terminal and intermediate station, more clearly showing the circuits and the course and operation of the current when the cars pass each station.

Our invention relates chiefly to that class of visual signals which are employed for the purpose of "blocking" railway trains, of indicating the approach of trains at highway-crossings and bridges, and for various purposes at railway stations; and it consists in the employment of novel mechanical and electrical means whereby the signals are operated either by the trains or by the engine without the use of batteries, except at the terminal stations, without breaking the currrent, and without employing either a return wire or a ground circuit, except as hereinafter described.

In the drawing, A represents ordinary electro-magnets. B B are armatures attached to pivoted levers. C C are signals, also attached to pivoted levers, having a bearing a short way from one end, as shown. The free end of the armature-levers is connected to the short arm of the signal-levers. The weight of the signals draws the armature-levers away from the poles of the magnets when the latter are demagnetized, and D D are stops against which the armatures rest when not in contact with the magnets. In order to admit of the armatures being easily drawn to the magnets, the ends of the short arm of the signal-levers are preferably weighted, so as to nearly balance the weight of the signals. E E are binding-posts. F is a binding-post to which a spring is attached, and G is a binding-post provided with a shoulder. H is a crank-lever, one end of which rests against the spring of the post F. I is the track, having a yielding rail, which rests on the other end of the lever H. This rail is in all respects like the other rails of the track, but is not so rigidly supported but that the weight of the cars in passing over it will cause it to yield sufficiently to move the lever H. J is a spring pressing the lever H. When the cars are not at the station the spring J forces the lever H against the spring of the post F, so that the spring last mentioned will be held in contact with the shoulder of the post G. The upper end of the lever H is insulated from the spring on post F. When the cars reach the station, the action of the lever H is such as to release the spring of the post F from its contact with the shoulder of the post G. K K are cases in which the signals vibrate, each side of the case having an opening to exhibit the signal when it is raised. F' and G' are binding-posts at intermediate stations, in all respects like, and corresponding to, the posts F and G, respectively. L and M are also binding-posts at intermediate stations, and constructed like the posts F' and G'. H' is a crank-lever, constructed and operating in all respects like the lever H, except that as it releases the spring of post F' it crowds the spring of post L against the shoulder of post M. A' is a delicate magnet which may be used with advantage for the purpose of controlling the other magnets. The armatures of the magnets A are not instantaneous in their action, and if these magnets are charged for an instant only, the armatures may not be attracted to them. In like manner, if these magnets are demagnetized for an instant only, their armatures may be prevented from reaching the stops D D. When this danger is probable we use magnets A' in connection with the magnets A, connecting the outer end of the coil of the former with the outer end of the coil of the latter, and carrying the outer end of the former to the post E. When the armature of the magnets A' is attracted the current continues through both magnets, thus giving the armatures B B ample time to be attracted to their magnets; and when the magnets A' are demagnetized they remain so until the current is again shifted, thus giving the armatures B B ample time to reach the stops D D, as will hereafter more fully appear.

When the magnets A' are not used and the cars are not at the station, the circuits are as follows: From the battery at the terminal stations to binding-post D of the instruments there placed, respectively, each battery having a ground connection; from post D over the lever of the armature B to post G; from thence over the shoulder of post G, and the spring in contact therewith, to post F; from thence to binding-post E, and over a line to post D of the next instrument; thence over the lever of armature B to post F', and from post F' to post G' as from post G to post F; from thence to post E, and so on to the terminal station at the opposite end of the line, and through the batteries to the ground. One end of the coil of the magnets A enters the post E, and the other enters the post D, as shown. When the magnets A' are used the circuit is over the armature-levers of these magnets instead of over the levers of the armatures B B, as shown in Plate 2. The magnets A' are also provided with stops D D.

When the cars are at terminal station No. 1 the posts G and F are disconnected and the current is shifted from post D, through the magnets of the instrument there placed, to post E, and from thence it proceeds over a line to post D at intermediate station No. 2, and over the circuit described to the ground. The magnets at station No. 1 now attract their armature and a signal is there displayed until the cars reach intermediate station No. 2. The signal remains displayed at station No. 1 until the cars reach station No. 2, for the reason that the armature-lever at instrument No. 1 is no longer in contact with post D; hence, though the posts G and F are connected as soon as the cars leave station No. 1, the current can no longer pass over the instrument and reach the posts F and G, but continues through the magnets and to instrument No. 2 in the manner described. When the cars reach the station last mentioned the posts F' and G' are disconnected and posts L and M connected. The current is now shifted from post D at instrument No. 1, and proceeds directly from the battery at the same station over a line to post M, and from thence to post L, and from thence over the circuit described to the ground. The movement of the lever H', which connects the posts L and M, demagnetizes magnets A at station No. 1, and their armature is released and rests in its original position against the post D, and the signal at this station is thus lowered, and the current is over the same circuit from station 1 to station 2 as at first described. The magnets at station No. 1 are demagnetized by connecting posts L and M, because the circuit from the battery at station No. 1 to post M is shorter than through the magnets there placed and over the line to posts D and L at station No. 2, and this short circuit is closed by uniting posts M and L, and the circuit or current proceeds to station No. 3. By connecting post F' and G' the current is shifted from the post D at station No. 2 through the magnets there placed to the post E of said last-named station, and from thence over the line to the next succeeding station. This magnetizes the magnets at station No. 2, and their armature is drawn from the post or stop D and raises the signal, which in turn is lowered in the manner described when the cars reach the next following station.

From the foregoing description it will be perceived that only trains going in one direction will operate the signals in the manner described.

When it is desired to have trains going in either direction over a single track operate the signals we make the changes indicated by the dotted lines in Plate 3. For a double track, we duplicate the signals and provide each track with an independent line.

Intermediate batteries may be used over very long lines when it may not be deemed desirable to employ batteries of sufficient force at the terminal stations; but these intermediate batteries are not "grounded," and their employment over lines of ordinary length may be dispensed with, and are unnecessary whenever terminal batteries of sufficient force are employed.

Our main line is really a battery-wire which we "tap" wherever a signal is placed; and the current is constant from one terminal station to the other, and the signals are operated by "shifting" instead of "breaking" it.

It will also be observed from the foregoing description that we do not employ a metallic return circuit in the manner or for the purpose that such circuits are commonly employed. We carry two wires over the line, so that when the cars are at any station the magnets at the next preceding station may be "shunted" in the manner described.

Having thus described our invention, what we claim as new, and desire to secure by Letters Patent, is—

1. An electric visual signal, operated by means of passing railway trains or engines acting upon mechanism which displays the signal by shifting the current, substantially as described.

2. A yielding or flexible rail in a railway, in combination with an electro-mechanical railway-signal, substantially as and for the the purpose specified.

3. The magnets A', in combination with other electro-magnets in the same circuit, and for the purpose of controlling the latter, substantially as described.

4. Two or more electro-mechanical signals operated by armature-levers and by means of circuits and shifted currents, which simultaneously attract the armature at one station and release the armature at the next preceding station, substantially as specified.

5. A line of three or more electro-mechanical signals, operated consecutively by the employment of grounded batteries at the terminal stations only, and without a return metallic circuit, except as described.

The foregoing specification signed by us this 22d day of May, A. D. 1872.

ELERY P. WARNER.
JOHN B. ODELL.

Witnesses:
F. M. GRANT,
A. W. BERGGREN.